Feb. 21, 1961 T. J. McKEY 2,972,374
CONTROL MECHANISM FOR RECLINING SEAT BACK
Filed July 25, 1958 2 Sheets-Sheet 2
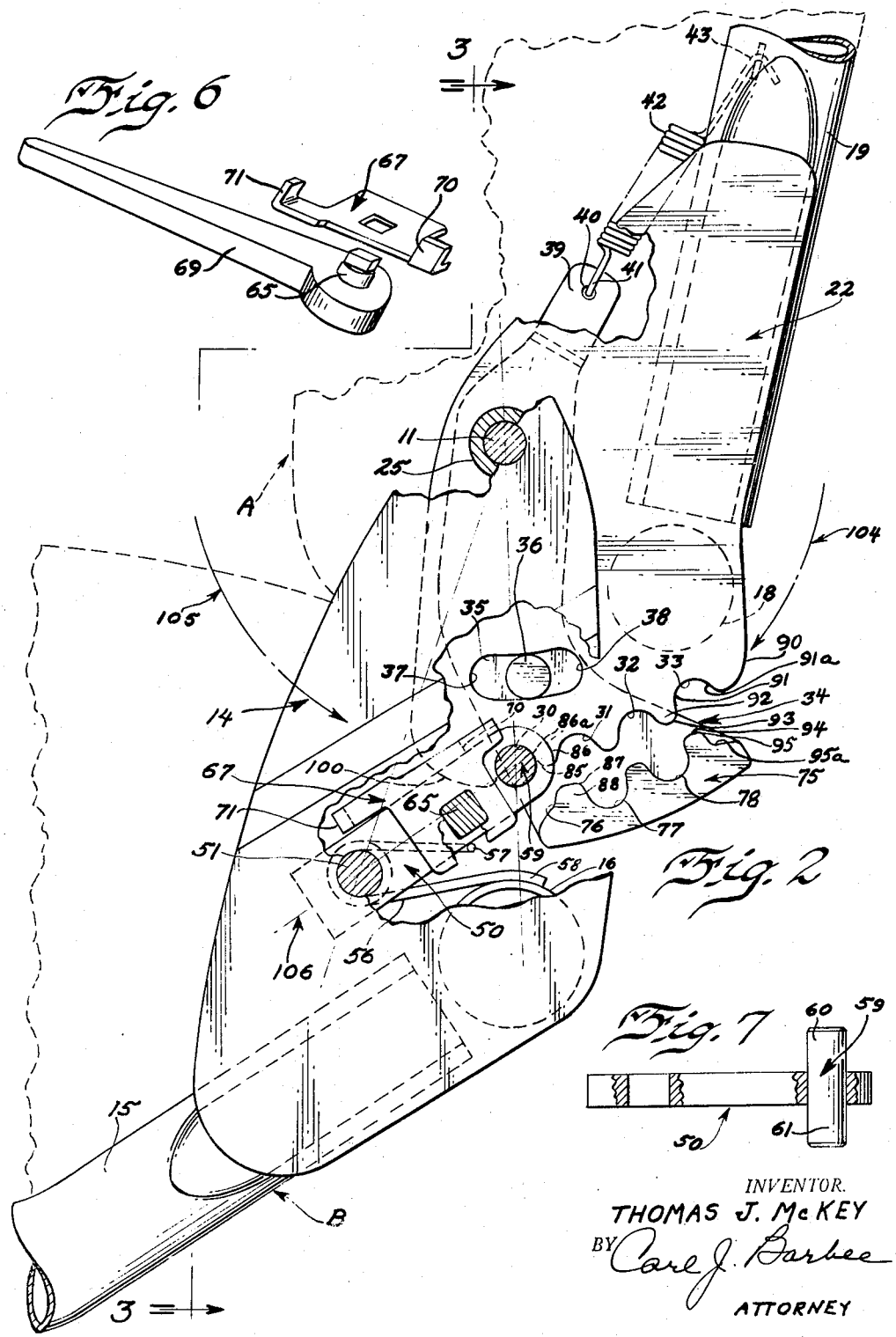
INVENTOR.
THOMAS J. McKEY
BY Carl J. Barbee
ATTORNEY United States Patent Office 2,972,374
Patented Feb. 21, 1961

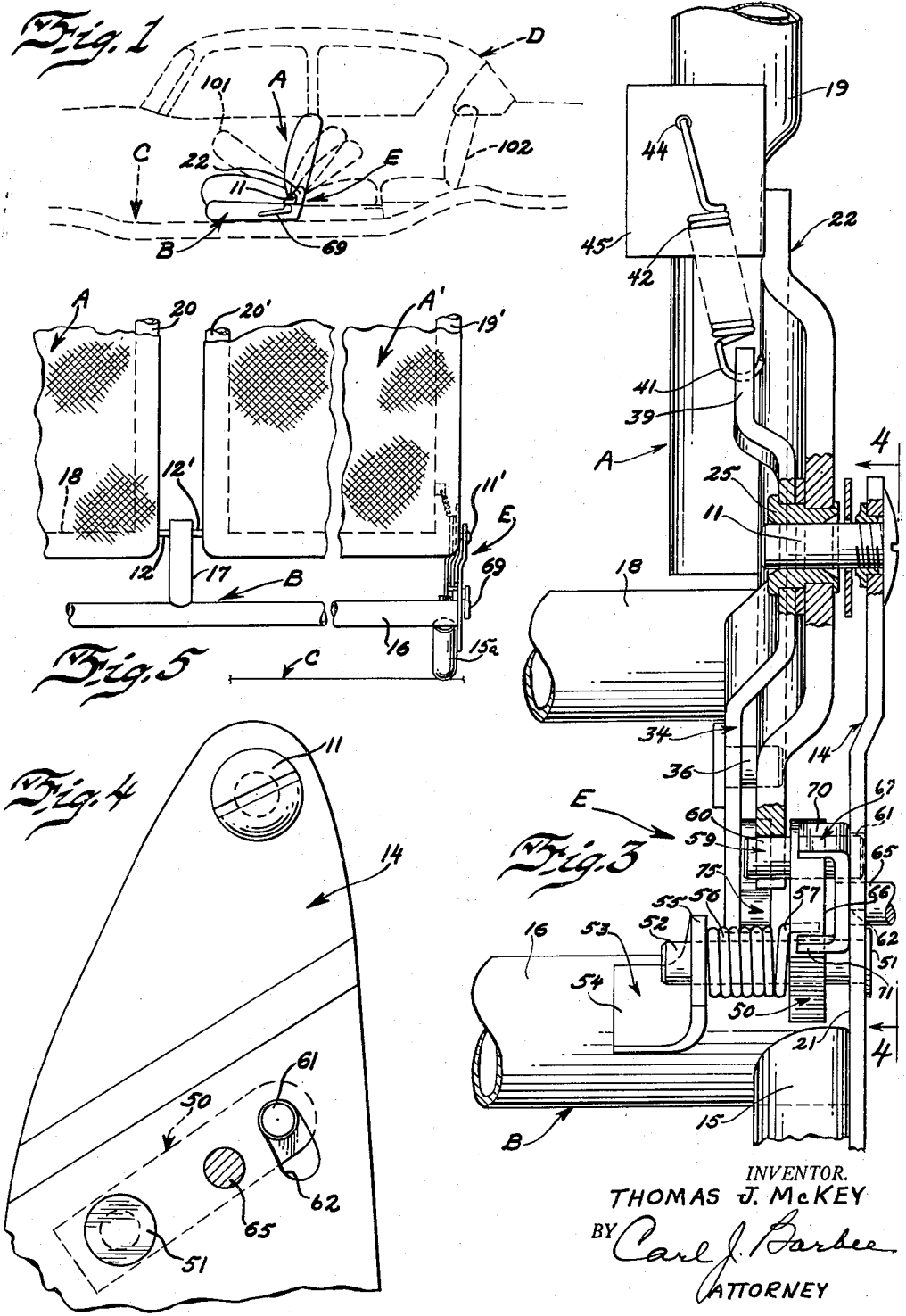

2,972,374
CONTROL MECHANISM FOR RECLINING SEAT BACK

Thomas J. McKey, Grosse Pointe, Mich., assignor to American Motors Corporation, Kenosha, Wis., a corporation of Maryland Filed July 25, 1958, Ser. No. 751,096

6 Claims. (Cl. 155—160)

The invention relates to seat backs of the type subject to a controlled raising or lowering to any of a number of selected positions of reclination between upright or sitting position and horizontal or bed position.

The invention has particular reference to the control mechanism utilized in connection with the raising or lowering of the seat back.

An object is to provide a hinged seat back having the entire control mechanism therefor situated at only one end thereof.

Another object is to provide a control mechanism employing a simplified type of latch operation.

Another specific object is to provide control mechanism employing a latch apparatus capable of operation with a minimum of physical effort.

Another object is to provide an arrangement of brackets wherein the seat frame bracket is situated on the outside and the brackets forming part of the control mechanism are each situated on the inside of the seat frame bracket—the latching mechanism having multiple functions in conjunction with such brackets.

Another object is to provide control mechanism for a reclining type seat in which manufacturing costs are reduced.

Other objects and advantages of the invention will be apparent from the ensuing specification and accompanying drawings in which:

Figure 1 is a side elevational view on a reduced scale of a seat assembly employed with an automobile and showing the various positions of reclination of the seat back.

Figure 2 is a fragmentary side elevational detail view of the control mechanism by which seat back reclination is effected—such view being taken from the same position as in Figure 1.

Figure 3 is a fragmentary detail front view of the control mechanism of Figure 2 and taken on the line 3—3 of Figure 2.

Figure 4 is a fragmentary detail view taken on the line 4—4 of Figure 3 and with various background components removed.

Figure 5 is a fragmentary rear view on a reduced scale of the seat assembly of Figure 1 and showing the control mechanism on that seat back which is adjacent the seat back of the driver of the automobile.

Figure 6 is an exploded perspective detail view of the latch operating handle assembly on a slightly reduced scale.

Figure 7 is a fragmentary detail plan view of the latch arm alone.

In general, the invention contemplates a seat assembly in which adjacent seat backs A and A' are hingedly carried on a seat frame B which is supported on the floor C of an automotive vehicle D—the seat back being capable of adjustment to any of a number of selected positions of reclination (as shown in dotted lines in Figure 1) subject to the actuation of the control mechanism E.

Each seat back is hingedly carried relative to the seat frame on hinge pins 11 and 12 and 11' and 12' respectively. Hereinafter, the description of the invention will be confined to one seat back and its control mechanism unless otherwise noted—the control mechanism for each seat back preferably being of similar construction except that one would be "left hand" and the other "right hand." The hinge pin 11 is carried by the support bracket 14 which in turn is secured to and serves as part of the seat frame members 15 and 16 of the seat frame B. The hinge pins 12 and 12' are carried by a suitable support pillar 17 which may be anchored to the seat frame member 16. Thus the seat back may be swung from the upright position as shown in solid lines in Figure 1 to any of several intermediate reclining positions and then to a horizontal or bed position, all as shown in dotted lines in Figure 1, subject to actuation of the control mechanism E.

The seat frame may include the rear tubular member 16 and the spaced tubular side members 15 and 15a (see Figs. 2, 3 and 5) and the seat backs may include their individual lower tubular members 18 and 18' and respective spaced upright tubular end members 19 and 20 and 19' and 20'. The support bracket 14 has its inner face 21 secured, as by welding, to the tubular frame members 15 and 16 and the seat back carrying bracket 22 has its inner frace secured, as by welding, to the tubular members 18 and 19. The hinge pin 11 projects through the bushing 25 which is anchored in the seat back carrying bracket. The bushing may be rotatively supported on the hinge pin. The seat back carrying bracket may be in the form of a stamping provided at its underneath edge with a succession of notches 30, 31, 32 and 33 and an indexing bracket 34 is hingedly carried on the bushing 25 so as to be capable of swinging movement relative to the seat back carrying bracket within a limited range as permitted by the elongated slot 35 which is formed in the seat back carrying bracket. A pin 36 is anchored to the indexing bracket and projects laterally therefrom into the slot 35 for engaging the opposite ends 37 and 38 thereof, as will be explained more fully hereinafter. The upper end 39 of the indexing bracket is apertured at 40 to receive one end 41 of tension spring 42, the other end 43 of which is hooked in the aperture 44 of bracket 45 which is anchored to tubular member 19. Referring to Figure 2, the indexing bracket 34 is shown in neutral position wherein the pin 36 is situated about midway between the ends of slot 35. In this position the axis of the spring 42 is substantially in alignment with the axis of hinge pin 11 and the aperture 44 in the bracket 45. Any pressure exerted on the indexing bracket at one side thereof will cause same to swing about the axis of pin 11 until the pin 36 engages an end of slot 35—such swinging movement serving to energize the spring 42 so that the indexing bracket is returned to the neutral position as shown in Figure 2 when the pressure exerted thereon is released.

A latch arm 50 is rotatively mounted on a pin 51 which extends through the wall of the support bracket 14 and has its free end 52 projecting through an L-shaped bracket 53, one leg 54 of which is secured to the tubular member 16 and the other leg 55 of which projects radially outwardly from the tubular member. A torsion spring 56 has one of its ends 57 hooked under the latch arm 50 and its remaining end 58 abutting the tubular member 16 whereby the latch arm, under the influence of the spring, is continuously urged to swing upwardly about the axis of pin 51 into a position as shown in Figure 2. A latch member identified generally by the numeral 59 is secured in the free end of the latch arm and is in the form of a pin, one end 60 of which serves as the latch element and the opposite end 61 of which projects through an elongated slot 62 which is cut through the wall of the support bracket 14, as viewed in Figure 4. The slot 62 serves to positively limit the extent of the swinging movement of the latch arm 50 for reasons to be explained hereinafter.

A pin 65 projects through the support bracket 14 and is rotatively carried thereby, the inner end of such pin terminating short of the outer face 66 of the latch arm as viewed in Fig. 3. A latch arm actuator identified generally by the numeral 67 is secured to the end of the pin 65 so as to be actuated by rotation of said pin. A handle 69 is secured to the opposite end of the pin 65 for effecting rotation of same. One end 70 of the actuator is bent so as to overhang the end of the latch arm near the latch member 59 and the other end 71 is bent to overhang the latch arm near the pin 51, thereby assuring that the handle 69 remains in a substantially constant position, generally as shown in Fig. 1, for manipulation purposes. An upward pull on the handle 69, viewing Figure 1, causes clockwise rotation of pin 65, viewing Figure 2, thereby causing the end 70 of the actuator to engage the latch arm and in turn causing it to be swung downwardly about the axis of pin 51. When the handle 69 is released, the torsion spring 56 urges the latch arm back upwardly about the axis of pin 51. By utilizing the actuator 67 which rotates about an axis which is located closer to the latch element than it is to the pivot pin 51, a leverage advantage is obtained whereupon actuation of the latch arm is effected with a minimum of physical effort.

The indexing bracket 34 has a segment 75 secured to the outer face thereof and at the lower edge thereof. The segment projects laterally from the side face of the indexing bracket so as to underlie the notches in the seat back carrying bracket. The segment is provided with notches 76, 77 and 78 and the inner end 60 of the latch pin coacts alternately with this set of notches and with the notches in the seat back carrying bracket during the raising and lowering of the seat back.

Operation

Assuming that the seat back A is situated in its normal upright position as shown in solid lines in Figure 1—in this position the latch element 60 is received within the notch 30 of the seat back carrying bracket and the indexing bracket 35 will be situated in the neutral position as shown in Figure 2. When it is desired to lower the seat back to the first station of reclination beyond normal upright position, it is only necessary to manually grasp the handle 69 and pull upwardly on same. The latch element 60 moves downwardly into the notch 76 and the seat back will continue to swing downwardly until the end wall 38 of slot 35 engages the pin 36. At this point the seat back movement is arrested as a result of the latch element 60 being held in notch 76 by virtue of the upward manual pressure being exerted on the handle 69. In the neutral position of the indexing bracket, the gap between the peak 85 of the tooth 86 (which is formed between successive notches 30 and 31) and the peak 87 of the tooth 88 (which is formed between notches 76 and 77) is not sufficient to permit passage of the latch element 60. However, when the seat back carrying bracket has advanced to the point where slot wall 38 engages pin 36, then the tooth 86 will be advanced sufficiently far forwardly with reference to the tooth 88 whereby the gap between the peaks of such teeth is sufficient to accommodate the diameter of the latch element 60, permitting same to pass therethrough and on into the notch 31. The handle is released in order to permit the spring 56 to swing the latch arm upwardly until the latch element 60 enters notch 31. At this point the indexing bracket is free of the latch element and the spring 42 will cause same to swing forwardly to the neutral position of Figure 2 wherein the notch 77 is in appropriate position to receive the latch element 60 upon the next upward pull on handle 69. If further reclination of the seat back is required, the steps immediately described hereinbefore will be repeated until the latch element 60 reaches the last notch 33. Upward manual pressure on the handle 69 at this stage will cause the latch element to leave notch 33 and ride along the arcuate surface 90 as the seat back moves on to the horizontal or bed position. The latch arm is maintained in appropriate working position for any subsequent raising of the seat back as a result of the elongated slot 62 into which the latch pin end 61 projects —such slot, of course, defining the maximum limits of swinging movement of the latch arm so that the latch element 60 is always in appropriate working position relative to the bracket notches. In practice, it is desirable to have the pin end 61 engage the upper end of slot 62 at the moment latch element 60 "bottoms" in one of the notches 30, 31, 32 or 33 thereby tending to lessen any tendency of the latch element binding in one of the bracket notches.

With the handle 69 released and the seat back either in upright position or one of the other positions of reclination, the entire load imposed on the seat back by the occupant of the seat is carried by the engagement of a tooth of the seat back carrying bracket with the latch element 60 of the latch arm. In other words, assuming the seat back to be in the position shown in Fig. 2, the latch element 60 is received within the first notch 30 of the seat back carrying bracket and if the occupant of the seat leans back against the seat back, the entire load imposed on such seat back is absorbed by engagement of the forward wall 86a of the tooth 86 with the latch element 60 (it being borne in mind that the seat back is freely hinged at its opposite end on pin 12).

The position and configuration of the forward wall 86a and the corresponding forward walls of the succeeding teeth are calculated with reference to a line 106 drawn through the axes of pins 51 and 59 and with reference to the line of force (which follows an arcuate path generated from the axis of pin 11) indicated by the curved line 104 in Fig. 2 so that when pressure is exerted on the forward wall 86a (by leaning back against the seat back) the latch element is unable to move out of the notch 30. It may be said that the latch element 60 is "above" or "beyond" dead center with reference to the tooth wall 86a and the line of force 104 and consequently is more firmly held in notch 30 as the rearward pressure on the seat back increases. A different situation exists when the seat back is being raised from a horizontal position to an upright position, as will be explained more fully hereinafter. It should be noted that it is usually advisable for the seat occupant to lean forward slightly (to remove the excess load on the seat back) before pulling up on handle 69, thereby facilitating withdrawal of the latch element out of notch 30. It should also be noted that in the normal upright position as shown in Fig. 1, the seat back is inclined from the vertical so that there is a constant rearward thrust on the seat back as a result of gravity and such gravity load is sufficient to cause the rearward swinging of the seat back to the next station of reclination when the handle 69 is pulled upwardly.

When it is desired to raise the seat back to the upright position (or to any one of the intermediate positions of reclination), it is only necessary to manually grasp the upper end of the seat back and pull upwardly on same while the latch element 60 ratchets back and forth between the sets of notches in the seat back carrying bracket and in the indexing bracket. No attention is given to the handle 69 when raising the seat back from the horizontal to the upright position. During the upward movement of the seat back, the action of the latch arm is as follows. The latch element 60 follows the arcuate edge 90 until it pops into notch 33 under the influence of spring 56 and continued upward pressure on the seat back then causes the rear wall 91 of tooth 92 to commence forcing the latch element out of the notch 33. The position and configuration of the rear wall 91 of tooth 92 and the corresponding rear walls of the remaining teeth formed between the notches, 32, 31 and 30 are calculated with reference to the line 106 drawn through the axes of pins 51 and 59 and with reference to the line of force indicated by the curved line 105 in Fig. 2 so that when pressure is exerted by the wall 91 on the latch element 60, the wall 91 will cause the latch element to automatically pop out of notch 33. It may be said that the latch element 60 is "below" or "short of" dead center with reference to the tooth wall 91 and the line of force 105 and that it is "above" or "beyond" dead center with reference to the tooth wall 86a and the line of force 104 (see Fig. 2). In other words, during the raising of the seat back, the latch element automatically pops out of the successive notches 33, 32, 31 and 30 because of the latch element being "below" or "short of" dead center, whereas, when the seat back is being lowered, it is necessary to pull up on handle 69 for actuating the latch arm to withdraw the latch element out of notch 30 (or the succeeding notches 31, 32 and 33).

Referring again to the operation of the apparatus during the raising of the seat back as the latch element is coming out of notch 33, the gap between the peak 93 and the peak 94 is normally insufficient to permit passage of the latch element, thereby causing the latch element to engage the peak 94 (at the rearward corner 95 thereof) and the indexing bracket is swung forwardly about the axis of pin 11 until the pin 36 engages the end wall 37. At this stage, the peak 93 has moved sufficiently far rearwardly with reference to peak 94 that the gap is large enough to permit the latch element to pass over the peak 93 into notch 95a and then on into notch 32. At this stage, the indexing bracket is free of the latch element and swings (under the inducement of spring 42) back to the neutral position as shown in Figure 2. Continued upward pressure on the seat back causes the latch element to swing back and forth between the sets of notches in the seat back carrying bracket and the indexing bracket, automatically, until the latch element reaches notch 30.

In the instant application, it is desirable to permit the seat back to be swung forwardly beyond the upright position shown in solid lines in Figure 1, consequently, continued forward pressure on the seat back will cause the latch element 61 to automatically move out of notch 30 and commence riding along the arcuate edge 100 of the seat back carrying bracket while the seat back is pushed forwardly to the position indicated by the numeral 101 in Figure 1. This forward position of the seat back is desirable in a two-door type of automobile for facilitating entry to the rear seat 102 of the automobile. Again, the elongated slot 62 in the support bracket 14 in conjunction with the latch pin end 61 assures that the latch arm with its latch element will be maintained in appropriate working position with reference to the two sets of bracket notches.

I claim:

1. A seat assembly comprising: a supporting frame forming the base of the seat assembly; first and second spaced supports carried by the frame; a seat back hingedly carried between the supports for swinging movement from an upright to a reclined position relative to the frame; latching mechanism having interconnection between that end of the seat back which is adjacent the first support, and the seat frame for effecting a controlled raising and lowering of the seat back relative to the frame; said latching mechanism including a first bracket secure with the seat back and an indexing bracket hingedly carried by the frame for limited swinging movement relative to the first bracket; the first support being situated in face to face fashion relative to the first bracket and having an opening therein; said first bracket being situated so as to lie between the first support and the indexing bracket; a latch swingably mounted on the first support and including a latch arm situated between the first support and the first bracket; an abutment on either side of the latch arm, one of such abutments serving as a latch element for movement between the first bracket and the indexing bracket and the other abutment being adapted for contacting opposing walls of the first support opening to limit the extent of the swinging movement of the latch arm; said first bracket having successive latch element receiving surfaces for positively holding the seat back in a selected position of reclination whenever the latch element is received in one of such surfaces; said indexing bracket having latch element receiving surfaces in proximity to and exposed toward the latch element receiving surfaces in the first bracket and serving for positively holding the seat back within a limited range of movement whenever the latch element is received in one of such surfaces, said latch element being positioned between the latch element receiving surfaces on the first bracket and the latch element receiving surfaces on the indexing bracket; control means for moving the latch element from one of the latch element receiving surfaces of the first bracket into engagement with one of the latch element receiving surfaces on the indexing bracket whereby gravity effects a lowering of the seat back during movement of the latch element from the first bracket to the indexing bracket.

2. A seat assembly comprising: a supporting frame forming the base of the seat assembly; first and second spaced supports carried by the frame; a seat back hingedly carried between the supports for swinging movement from an upright to a reclined position relative to the frame; latching mechanism having interconnection between that end of the seat back which is adjacent the first support, and the seat frame for effecting a controlled raising and lowering of the seat back relative to the frame; said latching mechanism including a first bracket secure with the seat back and an indexing bracket hingedly carried by the frame for limited swinging movement relative to the first bracket; said first bracket being situated so as to lie between the first support and the indexing bracket; a latch swingably mounted on the first support and including a latch arm situated between the first support and the first bracket and extending substantially radially outwardly with reference to the axis about which it swings; an abutment on either side of the latch arm, one of such abutments serving as a latch element for movement between the first bracket and the indexing bracket; means on the first support for coacting with the other abutment for limiting the swinging movement of the latch arm in either direction of such swinging movement; said first bracket having successive latch receiving surfaces for holding the seat back in a selected position of reclination whenever the latch element is received in one of such surfaces; said indexing bracket having latch element receiving surfaces in proximity to and exposed toward the latch element receiving surfaces in the first bracket and serving for holding the seat back within a limited range of movement whenever the latch element is received in one of such surfaces; control means for moving the latch element from one of the latch element receiving surfaces of the first bracket into engagement with one of the latch element receiving surfaces on the indexing bracket whereby gravity effects a lowering of the seat back during movement of the latch element from the first bracket to the indexing bracket.

3. A seat assembly comprising: a supporting frame forming the base of the seat assembly; first and second spaced supports carried by the frame; a seat back hingedly carried between the supports for swinging movement from an upright to a reclined position relative to the frame; latching mechanism having interconnection between that end of the seat back which is adjacent the first support, and the seat frame for effecting a controlled raising and lowering of the seat back relative to the frame; said latching mechanism including a first bracket secure with the seat back and an indexing bracket hingedly carried by the frame for limited swinging movement relative to the first bracket; a latch pivotally mounted on the frame for movement between the brackets; said first bracket having successive latch receiving surfaces for positively holding the seat back in a selected position of reclination whenever the latch is received in one of such surfaces; said indexing bracket having latch receiving surfaces in proximity to and exposed toward the latch receiving surfaces in the first bracket and serving for positively holding the seat back within a limited range of movement whenever the latch is received in one of such surfaces; control means for moving the latch from one of the latch receiving surfaces of the first bracket into engagement with one of the latch receiving surfaces on the indexing bracket whereby gravity effects a lowering of the seat back during movement of the latch from the first bracket to the indexing bracket, said control means including an actuator having contact with the latch for actuating same, said actuator being mounted for swinging movement about a stationary axis on the frame and the axis of such mounting being situated closer to the point of contact of the actuator with the latch than the pivotal mounting of the latch on the frame.

4. A seat assembly as set forth in claim 2 wherein spring means are mounted on the frame for normally urging the latch arm in one direction toward the latch element receiving surfaces on the first bracket.

5. A seat assembly comprising: a supporting frame forming the base of the seat assembly; first and second spaced supports carried by the frame; a seat back hingedly carried between the supports for swinging movement from an upright to a reclined position relative to the frame; latching mechanism having interconnection between that end of the seat back which is adjacent the first support, and the seat frame for effecting a controlled raising and lowering of the seat back relative to the frame; said latching mechanism including a first bracket secure with the seat back and an indexing bracket hingedly carried by the frame for limited swinging movement relative to the first bracket; the first support being situated in face to face fashion relative to the first bracket and having an opening therein; said first bracket being situated so as to lie between the first support and the indexing bracket; a latch swingably mounted on the first support and including a latch arm situated between the first support and the first bracket; an abutment on either side of the latch arm, one of such abutments serving as a latch element for movement between the first bracket and the indexing bracket and the other abutment being adapted for contacting opposing walls of the first support opening to limit the extent of the swinging movement of the latch arm; said first bracket having successive latch element receiving surfaces for positively holding the seat back in a selected position of reclination whenever the latch element is received in one of such surfaces; said indexing bracket having latch element receiving surfaces in proximity to and exposed toward the latch element receiving surfaces in the first bracket and serving for positively holding the seat back within a limited range of movement whenever the latch element is received in one of such surfaces, said latch element being positioned between the latch element receiving surfaces on the first bracket and the latch element receiving surfaces on the indexing bracket; control means for moving the latch element from one of the latch element receiving surfaces of the first bracket into engagement with one of the latch element receiving surfaces on the indexing bracket whereby gravity effects a lowering of the seat back during movement of the latch element from the first bracket to the indexing bracket, said control means including an actuator having contact with the latch arm for actuating same, said actuator being mounted for swinging movement about a stationary axis on the frame and such mounting being situated closer to the point of contact of the actuator with the latch arm than the pivotal mounting of the latch arm on the frame and said actuator having means coacting with the latch arm for limiting rotative movement of such actuator about its axis in either direction of rotation.

6. Apparatus as set forth in claim 5 wherein the actuator includes laterally bent ears contacting the latch arm, one of which effects actuation of the latch arm in one direction of rotation and the other of which limits rotative movement of the actuator about its axis in the reverse direction of rotation.

References Cited in the file of this patent
UNITED STATES PATENTS
Re. 24,528    Borisch _____ Sept. 2, 1958